US012003935B2

(12) United States Patent
Putzeys et al.

(10) Patent No.: US 12,003,935 B2
(45) Date of Patent: Jun. 4, 2024

(54) LOUDSPEAKER WITH A NON-UNIFORM SUSPENSION AND AN ENFORCEMENT ELEMENT

(71) Applicant: PURIFI APS, Hojbjerg (DK)

(72) Inventors: Bruno Putzeys, Achel (BE); Lars Risbo, Hvalso (DK); Carsten Tinggaard, Viby Sjælland (DK)

(73) Assignee: PURIFI APS, Hojbjerg (DK)

( * ) Notice: Subject to any disclaimer, the term of this patent is extended or adjusted under 35 U.S.C. 154(b) by 196 days.

(21) Appl. No.: 17/594,315

(22) PCT Filed: Apr. 8, 2020

(86) PCT No.: PCT/EP2020/060008
§ 371 (c)(1),
(2) Date: Oct. 11, 2021

(87) PCT Pub. No.: WO2020/208070
PCT Pub. Date: Oct. 15, 2020

(65) Prior Publication Data

US 2022/0167089 A1 May 26, 2022

(30) Foreign Application Priority Data

Apr. 11, 2019 (EP) .................................... 19168652

(51) Int. Cl.
*H04R 7/20* (2006.01)
*H04R 7/18* (2006.01)
*H04R 9/06* (2006.01)

(52) U.S. Cl.
CPC ................. *H04R 7/20* (2013.01); *H04R 7/18* (2013.01); *H04R 9/06* (2013.01); *H04R 2207/021* (2013.01); *H04R 2307/207* (2013.01)

(58) Field of Classification Search
CPC ... H04R 7/06; H04R 7/18; H04R 7/20; H04R 7/122; H04R 9/06; H04R 2207/021; H04R 2307/204; H04R 2307/207
See application file for complete search history.

(56) References Cited

U.S. PATENT DOCUMENTS 3,130,811 A 4/1964 Petrie
3,997,023 A 12/1976 White
(Continued)

FOREIGN PATENT DOCUMENTS

EP 0556786 A2 8/1993
EP 1659823 A2 5/2006
(Continued)

OTHER PUBLICATIONS

International Search Report with Written Opinion from PCT Application No. PCT/EP2020/060008, dated Jun. 9, 2020.
(Continued)

*Primary Examiner* — Huyen D Le
(74) *Attorney, Agent, or Firm* — Workman Nydegger

(57) ABSTRACT

A loudspeaker with a non-uniform surround, a membrane and a stiffening element preventing the surround from flexing the membrane during operation. A non-uniform surround does not have the same cross section, along the radius of the speaker if circular, all around the perimeter of the membrane as some portions will be upwardly directed and other portions downwardly directed.

16 Claims, 2 Drawing Sheets

(56) References Cited

U.S. PATENT DOCUMENTS

| | | | | | |
|---|---|---|---|---|---|
| 5,371,805 | A * | 12/1994 | Saiki | H04R 7/06 181/173 |
| 5,418,337 | A | 5/1995 | Schreiber | |
| 6,305,491 | B2 | 10/2001 | Iwasa et al. | |
| 6,516,077 | B1 | 2/2003 | Yamaguchi et al. | |
| 6,889,796 | B2 | 5/2005 | Pocock et al. | |
| 7,218,748 | B1 | 5/2007 | Stompler | |
| 7,275,620 | B1 | 10/2007 | Diedrich et al. | |
| 9,042,580 | B2 * | 5/2015 | Gao | H04R 1/00 381/162 |
| 2002/0170773 | A1 | 11/2002 | Stead et al. | |
| 2003/0231784 | A1 | 12/2003 | Kuze et al. | |
| 2006/0233416 | A1 | 10/2006 | Howze | |
| 2007/0071275 | A1 | 3/2007 | Matsuda et al. | |
| 2011/0164782 | A1 | 7/2011 | Bogdanov et al. | |
| 2012/0237076 | A1 | 9/2012 | Kuze | |
| 2013/0056296 | A1 * | 3/2013 | Goossens | H04R 7/18 181/157 |
| 2018/0288524 | A1 * | 10/2018 | Kagawa | H04R 7/04 |
| 2019/0058953 | A1 | 2/2019 | Ilkorur | |

FOREIGN PATENT DOCUMENTS

| | | | |
|---|---|---|---|
| EP | 1788839 | A1 | 5/2007 |
| WO | 2017104125 | A1 | 6/2017 |

OTHER PUBLICATIONS

Extended Search Report from corresponding EP Application No. EP19168652.6, dated Aug. 13, 2019.

"Fostex UDR speaker", Fostex, retrieved from https://www.fostexinternational.com/docs/speaker_components/pdf/fe208ez.pdf on Oct. 4, 2021, p. 1.

Olsen et al., "Diaphragm Area and Mass Nonlinearities of Cone Loudspeakers" Loudspeaker Distortion and Measurements, Technical University of Denmark, Oct. 1, 1995, pp. 1-9.

"KEF Whitepaper R&D The Reference," KEF, retrieved from http://www.kef.com/uploads/files/THE_REFERENCE/REF_White_Paper_preview_path_200514.pdf, no later than Oct. 8, 2021, 29 pages.

* cited by examiner

Figure 8
Figure 9
Figure 10
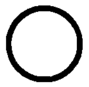
Figure 11
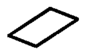
Figure 12
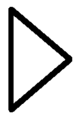
Figure 13

LOUDSPEAKER WITH A NON-UNIFORM SUSPENSION AND AN ENFORCEMENT ELEMENT

BACKGROUND

The present invention relates to a loudspeaker with a non-uniform suspension, such as suspensions which do not have the same cross section around the complete extent of the suspension, and which has an enforcement or stiffening element.

Loudspeakers with uniform or non-uniform suspensions may be seen in U.S. Pat. No. 6,305,491, US2011/164782, EP0556786, US2002/170773, the Fostex UDR speaker (https://www.fostexinternational.com/docs/speaker_components/pdf/fe208*ez*.pdf), U.S. Pat. No. 6,889,796, US2003/0231784, EP1659823, AES article "Diaphragm Area and Mass Nonlinearities of Cone Loudspeakers" from 1995 by Knud Thorborg and Erling Sandermann Olsen, U.S. Pat. Nos. 7,275,620, and 6,516,077. Other, uniform, suspensions may be seen in U.S. Pat. No. 7,218,748, EP1788839, U.S. Pat. Nos. 3,997,023, 3,130,811 and KEF whitepaper http://www.kef.com/uploads/files/THE_REFERENCE/REF_White_Paper_preview_path_200514.pdf.

Non-uniform suspensions may be provided for a number of reasons, one being that a uniform suspension, such as a half-roll, full-roll, multiple roll suspension will generate, with the membrane, an efficient membrane area depending on the position of the membrane in relation to the frame. Non-uniform suspensions may be shaped to avoid this variation. Non-uniform suspensions, however, have been found to generate non-uniform forces acting on the membrane edge, causing the membrane to flex and thus generate undesired vibrations and sound.

SUMMARY

It is an object of the invention to provide a loudspeaker with a non-uniform surround but where the membrane is not flexed by the operation of the surround.

In a first aspect, the invention relates to a loudspeaker comprising a membrane, a surround and a frame, where:

- the membrane has an outer edge,
- the surround is connected to the frame and at least substantially all of the outer edge of the membrane,
- the surround has a first portion and a second portion, where:
- the first portion is directed upwardly, such as by having a first radial cross section, and
- the second portion is directed downwardly, such as by having a second radial cross section, where the first and second radial cross sections have different shapes,
- the loudspeaker further comprising a stiffening element provided at the outer edge of the membrane.

In this context, a loudspeaker is an element configured to generate and output sound. Typical loudspeakers comprise a membrane or diaphragm which is movable, by a motor, in relation to a frame, a housing, a portion of the motor or the like.

A membrane typically is a relatively stiff and generally plane or funnel-shaped element connected to a drive for moving the membrane. The membrane often forms a sound and/or at least substantially gas tight seal between a chamber of a loudspeaker and the surroundings thereof. Naturally, multiple membranes may exist in the loudspeaker and may be provided in the same chamber. Also sound output ports, such as bass reflex ports, may be present if desired.

A membrane may be made of paper, cardboard, metal, polymer or combinations thereof. A membrane may be symmetric around an axis, such as axisymmetric. Often, membranes are circular, but oval membranes are also seen, as are rectangular membranes with rounded corners.

Membranes may have a central axis which is defined as the intersection between two planes of symmetry. Usually the intended direction of movement of the membrane lies along the central axis. The central axis has an upward direction that is away from the motor and toward the membrane.

Membranes and surrounds may have a radial cross section which is defined as a cross section through a plane coinciding with the central axis. A radial cross section of the surround may have a maximum, which is the point furthest upward along the central axis, and a minimum which is the point furthest downward along the central axis. An extremum is one of a maximum and a minimum.

A membrane surface may be more or less flat or plane, or it may be more contoured. A membrane may have ridges or the like, such as in a direction away from a central axis, in order to e.g. increase the stiffness of the membrane. Other membrane types have ridges formed as concentric rings, at the outer portions at least, which act to have only the innermost portion of the membrane vibrate at higher frequencies but more and more of the membrane for lower and lower frequencies.

The frame preferably is a rigid or stiff element which is not deformed to any substantial degree by the operation of the drive moving the membrane to create sound. Often, the frames are made of a metal. Often, frames are cone shaped with a base at which the drive is to be attached and an outer portion having a shape corresponding to the surround and to which the surround is to be attached. Between the base and the outer portion, struts may be formed connecting the base and the outer portion while leaving space for the membrane movement.

Often, the frame is, at its outer parts, to be connected to a loudspeaker cabinet in order to ensure that air is not able to, at least to any significant degree, escape the cabinet through the loudspeaker.

The membrane has an outer edge. Usually, the shape of this edge defines the shape of the membrane. Often, membranes are circular.

A surround is a flexible element connecting the, usually stiffer, membrane to the, usually much stiffer, frame so as to allow the frame to move in relation to the frame while controlling the membrane movement in relation to the frame and/or ensuring that air is not able to pass around the membrane edge, which passing would short circuit the membrane and thus destroy the sound generating properties.

Prior art surrounds often are half rolls or full rolls and have the same profile along the extent of the surround, i.e. these surrounds have uniform profiles. Often the cone edge and surround is circular (projected on a plane perpendicular to the central axis). In such case a uniform profile surround will be axisymmetric, i.e., it can be described as a profile defined in a 2D plane that is revolved around the central axis.

Often, surrounds are made of rubber, impregnated cloth or a closed foam, as such materials are light, flexible and still not permeable to air to any significant degree.

The connection of the surround to the membrane may be performed using e.g. glue (or co-moulding the surround on to the membrane). Naturally, any type of fastening may be used.

Normally, it is desired that the surround is attached or connected to the membrane at all of the outer portion and/or periphery of the membrane in order to maintain good control of the membrane over all of its outer edge and in order to ensure that air is not able to travel through the membrane/surround assembly.

Many surround types cause the effective acoustically radiating area of the membrane/surround assembly to vary as a function of the position of the membrane in relation to the frame. Often, when the membrane is as far as possible into the frame, the effective area is higher than when the membrane is as far away from the frame as possible (the two extreme portions of the operational interval of the membrane). The reason is that the shape of the surround, when e.g. being a standard half-roll, differs in these two positions.

Surrounds exist in which this problem is reduced. Surrounds of this type have a first portion and a second portion, where:

- the first portion has a first radial cross section, and
- the second portion has a second radial cross section,
- where the first and second radial cross sections have different shapes.

Thus, surrounds of this type have a radial cross section which differs at different positions along the surround, i.e. the surround profile is non-uniform along its circumference. The cross section may be that of the surround when seen from the membrane toward the frame, such as from a portion of the outer edge of the membrane to the closest point of the frame. If the membrane is axisymmetric, so is the frame and thus the inner and outer portions of the surround. In this situation, the first portion is a radial portion.

When the two portions have different radial cross sections, this means that the shape of the surround is not identical around the surround or along the surround. The two portions may have different curve shapes, different highest or lowest points, such as when measured from the outer edge of the membrane. The height may be seen in relation to a straight line from the edge of the membrane and the closest point of the frame—or between inner and outer edge of the surround.

The portions are different if, for example, the height, at a selected distance from the membrane edge and/or a central axis of the membrane, of one portion is more than 10% larger than the height at the same distance of the other portion.

Surrounds may be non-uniform for a number of reasons. One reason is, as mentioned above, to have at least the same effective area as the membrane moves relative to the frame. In this situation, the effective area of the membrane usually is the same, as membranes are usually sufficiently stiff to not bend to any significant degree. For a half-roll, the relevant area of the surround is approximately the area of all portions thereof inside the top point of the radial cross section of the surround. For a half roll, the maximum moves towards or away from the central axis depending on the membrane displacement along the central axis, thus changing the effective area.

Other surrounds have non-uniform profiles in order to prevent of sound waves off the surround.

It is an object of the present invention to reduce flexing of the membrane caused by the non-uniform surround. The loudspeaker thus further comprises a stiffening element provided at the outer edge of the membrane, such as at an interface between the membrane and the surround.

The stiffening element has the function of rendering the assembly of the membrane and the surround stiffer. It has been found that non-uniform surrounds, that do not have identical radial cross sections all along their extent, cause a flexure of the membrane at the outer edge. This flexure again causes a distortion of the radiated sound which clearly is not desired.

Thus, the stiffening element aims at the function of preventing flexure of the outer edge of the membrane during the movement of the membrane. Thus, the stiffening element should be adapted to the forces expected from the surround used. Depending on the shape of the surround, the non-uniformity of the forces acting on the outer edge of the membrane is more or less severe.

When the membrane flexes, portions of the outer edge are pulled inward towards the centre of the membrane while other portions are pushed outward away from the central axis. The outer edge thereof deviates from the shape it has when sitting in the rest position and not moving. If for example the membrane is circular, the flexure will change the shape so it has a number of lobes. Two lobes would give the edge an oval shape. Three lobes would give a more triangular shape. This phenomenon may occur at certain resonance frequencies.

The stiffening element may be as simple as a layer of a selected material attached to the membrane and/or the surround, such as a portion of the surround adjacent to or attached to the outer portion of the membrane. Clearly, an additional layer material may increase the stiffness. However, further below, other shapes of the surround are described which further increase the stiffness while keeping an eye on the mass added by the stiffening element.

The stiffening element may have different stiffness in different directions, such as in the direction perpendicular to an extent thereof and/or toward a central axis if the membrane and a direction along the movement of the membrane and/or drive. However, as the flexure of the membrane is rather complex, it may be desired that the stiffening element has at least substantially the same stiffness in all directions, such as in all directions perpendicular to a direction of a centre line of the stiffness element or a direction perpendicular to the outer edge of the membrane at a particular point.

The non-uniformity of the surround may be defined in many manners. In one situation, the radial cross sections of the first and second portions each defines a curve, such as of an upper surface, a lower surface or a centre of the surround. Then, the curve defined by the radial cross section of the first portion may be shorter than the curve defined by the radial cross section of the second portion. A shorter curve may be obtained when the curve between the two extreme points is more straight. This curve could be derived relative to the above straight line.

In that or another situation, the curve defined by the radial cross section of the first portion may have a more narrow bend than the curve defined by the radial cross section of the second portion. A more narrow bend may be a more narrow peak or trough.

In one situation, the radial cross sections of the first and second portions have a maximum (or minimum) at different distances to a centre of the membrane. Again, this may be determined relative to the above straight line.

In one situation, the radial cross section of the first and/or second portions may be U or V-shaped. Then, a portion between the first and second portions may have an M or W shaped radial cross section.

Also, the surround preferably defines, along a central, closed curve thereof, a repeating pattern. Then, the surround may have multiple portions with a radial cross section identical to that of the first radial cross section and multiple portions with a radial cross section identical to the second radial cross section.

Clearly, the stiffening element may have any desired radial cross section, such as a plane element, such as a sheet of material. One preferred shape is one where a portion of the stiffening element has a radial cross section which is L-shaped, T-shaped or I-shaped. Then, one of the plane sides of the stiffening element may be attached to the membrane and/or surround.

In another embodiment, the stiffening element has a portion, which has a radial cross section having a shape as a polygon, such as a triangle, rectangle (square, rhombus, parallelogram, trapezoid, kite or the like) or the like. Again, one of the plane sides may then be attached to the membrane and/or surround.

Actually, one of the substantially plane sides of the L-, I-, T- or polygon shape may be formed by the membrane and/or the surround, so that the desired shape is not arrived at before attachment to the membrane/surround.

Alternatively, the stiffening element may have a portion with a radial cross section which is oval, such as circular.

Clearly, the shape, dimensions, material and the like may be selected based on the flexing forces exerted on the membrane as well as the maximum weight addition caused by the stiffening element.

Preferably, the stiffening element forms a closed curve in a predetermined plane, such as in a plane in which the outer edge of the membrane also is found. The closed curve has the advantage that the stiffening element is present around all of the membrane. Preferably, this curve is outside of at least 75% of the radius/distance to the centre. Clearly, the stiffening element need not be positioned at the outer edge of the membrane to act to stiffen the outer portion of the membrane, as the membrane often will have a stiffness of its own. However, it is desired that the stiffening element, to perform its function is positioned at least in the outer quarter of the membrane—i.e. at a distance from a centre of the membrane being no less than 75% of the distance from that centre to the outer edge of the membrane. If the membrane is not circular, the stiffening element would normally have the same shape and thus be positioned at the same percentage of the overall distance, as measured perpendicularly from the central axis or along the membrane surface, from the central axis.

In one situation, the combined membrane and stiffness element has, when projected on to the plane, a mass per area which is higher at the stiffness element than inside the closed curve. Even though it may not be an aim in itself to have a higher mass at the stiffening element, an increased mass often implies or generates a higher stiffness.

In one embodiment, the diaphragm and stiffening element have a first mass per area, in a plane perpendicular to a direction of movement of the membrane, and the diaphragm has a second mass per area in the plane at a position not at the stiffening element, where the first mass per area is higher than the second mass per area. While a higher mass per area in this projection is not an aim in itself, a higher mass usually will give a higher stiffness as desired.

In one embodiment, the combined membrane and stiffness element has, in a direction perpendicular to the plane, thickness which is higher at the stiffness element than inside the closed curve. While a higher thickness is not an aim in itself, a higher thickness usually will give a higher stiffness as desired.

As described, the stiffening element may be a separate element attached to the membrane, or the membrane may be manufactured with a built-in stiffening element preferably at the outer portion thereof. This building-in may be by adding an element to the membrane material during manufacture of the membrane, by providing the membrane material thicker, heavier, stiffer or the like at the outer portion thereof. In one situation, the membrane may be moulded, where the mould may be designed to generate a stiffening element as described above. This moulding process could be a two-component moulding if desired. Alternatively, a portion of the membrane may be formed or shaped such as to constitute a thicker, stiffer portion.

A second aspect of the invention relates to a method of assembling a loudspeaker, the method comprising:

- providing a membrane having an outer edge,
- providing a surround having a first portion and a second portion, where:
- the first portion is directed upwardly, such as by having a first radial cross section, and
- the second portion is directed downwardly, such as by having a second cross section, where the shapes of the first and second cross sections differ,
- providing a stiffening element and
- fixing the outer edge of the membrane to the surround and the stiffening element.

Naturally, this aspect may be combined with the first aspect. The membrane, surround, first and second portions and the stiffening element may be as described above.

BRIEF DESCRIPTION OF THE DRAWINGS

In the following, preferred embodiments of the invention will be described with reference to the drawing, in which:

FIG. 7 illustrates alternative membranes with thicker or different materials at the outer edge and FIGS. 8-13 illustrate different types of stiffness elements.

DETAILED DESCRIPTION OF VARIOUS EMBODIMENTS

Figure 1:
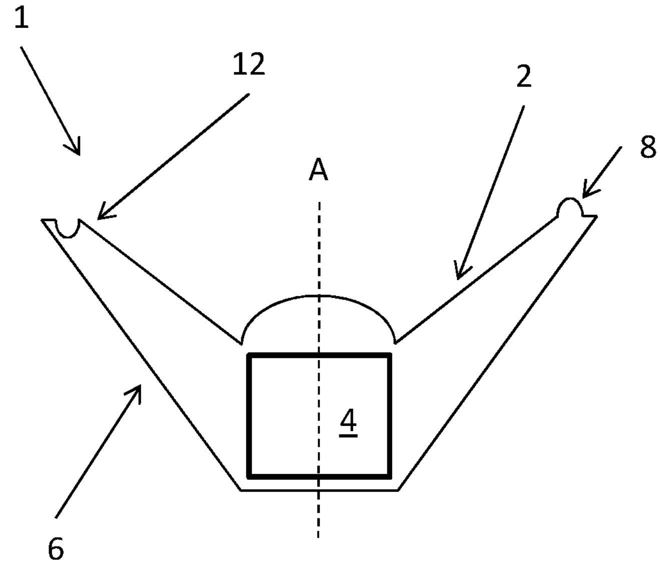
FIG. 1 illustrates a radial cross section of a loudspeaker according to the invention.

In FIG. 1, a loudspeaker 1 is illustrated having a membrane 2, a motor 4, a frame 6 and a surround 8. The motor is configured to move the membrane upwardly and downwardly along an axis A, and the surround is configured to prevent air from passing around the outer edge 12 of the membrane 2 and to control the movement of the membrane 2. The surround 8 is connected at its outer periphery to the frame 6.

When the surround is not completely uniform, the movement of the membrane will cause the surround to flex which again will cause the membrane to flex during the movement. This flexing causes distortion of the sound output, which naturally is not desired. In FIG. 1 the surround 8 is shown as non-uniform as evidenced from the different shapes of the left-hand and right-hand cross sections.

Figure 5:
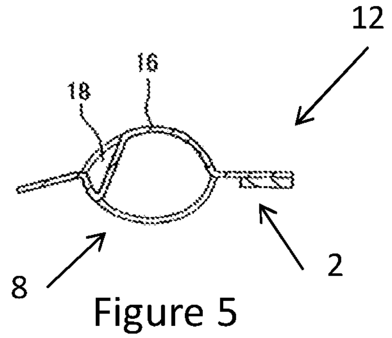
FIG. 5 illustrates a first embodiment of a non-uniform surround.
Figure 6:
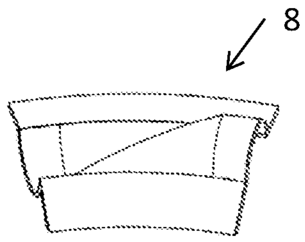
FIG. 6 illustrates a second embodiment of a non-uniform surround.

Non-uniform surrounds may be seen in FIGS. 5 and 6. The surround in FIG. 5 may be seen in U.S. Pat. No. 6,516,077 and has a number of ridges 18 directed tangentially to the outer edge 12. The remainder of the surround has the shape illustrated at 16. Clearly, different portions of this surround have different radial cross sections and thus different effects on the outer edge 12.

The surround in FIG. 6 may be seen in EP0556786 where a portion of the surround, in the cross section seen in FIG. 1, is directed downwardly and a portion is directed upwardly, where the intersection between these portions looks like that in FIG. 6. Clearly, the portion illustrated in FIG. 6 will have a different effect on the membrane than a half-roll portion as seen to the extreme left and right of the same figure.

These different effects on different portions of the outer edge will bring about a flexure of the membrane when moved.

Figure 2:
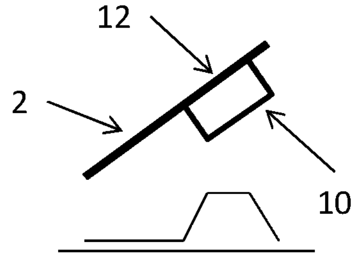
FIG. 2 illustrates a first embodiment of a stiffening element and the projected thickness thereof.
Figure 3:
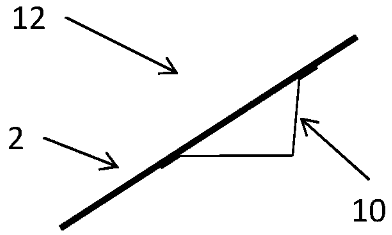
FIG. 3 illustrates a second embodiment of a stiffening element.
Figure 4:
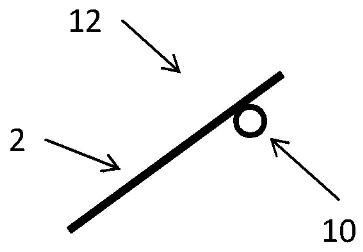
FIG. 4 illustrates a third embodiment of a stiffening element.

In order to counter-act this flexing, a stiffening element 10 is provided at the interface between the membrane and the surround. FIGS. 2-4 illustrate different shapes of such stiffening elements.

The flexure of the membrane is a deformation that causes portions of the outer edge to be pulled towards the central axis of the membrane and other portions to be pushed away from the central axis. Different modes of flexure will exist, where a first mode is one in which the outer edge becomes oval. A second mode is one wherein the outer edge has three lobes, and in a third mode, it has four lobes. Clearly, any number of lobes may be seen when flexing the membrane.

FIG. 2 shows a radial cross section, of the outer edge 12 of the membrane 2 and a stiffening element 10, where the radial cross section of the stiffening element is rectangular. One of the sides of the rectangle may be made up of the membrane material. The stiffening element extends along the outer edge of the membrane, typically as a closed curve when projected to a plane perpendicular to the axis A. Clearly, the stiffening element will counter-act the flexure of the outer edge 12. Also shown is the projected thickness of the assembly of the membrane and the stiffening element onto a plane perpendicular to the central axis A.

The radial cross section of the stiffening element may have any desired shape. In FIG. 3, the shape is triangular. Again, the membrane material may form one of the sides. Advantageously the shape may be a closed curve like a rectangle, polygon or oval.

In FIG. 4, the radial cross section of the stiffening element has a circular shape.

Naturally, any shape of the stiffening element may be used. A polygon may be used, and if desired, one or more sides may be formed by the membrane.

The stiffening element may be hollow or may be filled by a filling material, such as a foam.

The stiffening element may be made of any type of material. The stiffness, clearly, is desired high, but the weight is desired as low as possible. Thin aluminium, such as with a thickness of 0.5 mm or less, such as 0.25 mm or less, such as 0.2 mm or less, such as 0.15 mm or less may be used, as may other materials, such as metals, alloys, polymers, paper, cardboard, plastics, composite materials, Kevlar or the like.

A separate stiffening element may be replaced by an adaptation of the membrane material. Usually, the membrane is made of the same material with the same thickness, perpendicular to the extent of the membrane, over the full surface of the membrane. However, the membrane may be made thicker at the outer edge so as to increase the stiffness thereof.

Figure 7:
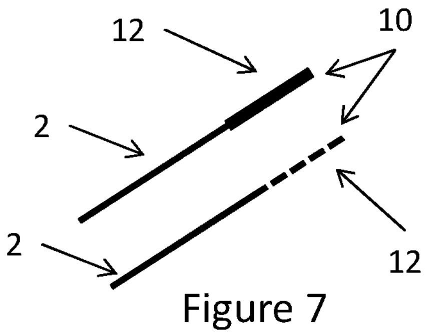

Further alternatively, the membrane may be made of another material or an additional material at the outer edge in order to increase the stiffness at the outer edge. This is illustrated in FIG. 7. A thicker layer of a material tends to be stiffer than a thinner layer. Also, the outermost portion of the membrane may be made of a stiffer material than the remainder of the membrane so as to increase the stiffness of the membrane at the outer edge.

FIGS. 8-13 illustrate further types of stiffening elements where FIG. 8 illustrates the addition of a thin layer of e.g. paper extending in the direction of the movement, whereas in FIG. 9, a layer of e.g. paper is provided extending in the direction perpendicular to the direction of movement. Alternatively, the square of FIG. 10 may be used, as may the circle of FIG. 11, the 45 degrees square (diamond) of FIG. 12, or the triangle of FIG. 13 having a 90-degree angle and a largest side extending in the direction of movement of the membrane.

Clearly, a number of different stiffening element types, shapes and the like may be used. Other materials may also be used in order to tailor the properties even more.

The invention claimed is:

1. A loudspeaker comprising a motor, a membrane, a surround and a frame, where:

the motor is configured to move the membrane upwardly and downwardly along an axis, the membrane has an outer edge, the surround is connected to the frame and at least substantially all of the outer edge of the membrane, the surround has a first portion and a second portion, where:

the first portion has a first radial cross section extending from a third portion of an outer edge of the membrane to a point of the frame being the closest to the third portion, which first portion is directed upwardly, and the second portion has a second radial cross section extending from a fourth portion of an outer edge of the membrane to a point of the frame being the closest to the fourth portion, which second portion is directed downwardly, the loudspeaker further comprising a stiffening element provided at the outer edge of the membrane, wherein a portion of the surround, between the first and second portions, has a cross section with an M or W shape.

2. The loudspeaker according to claim 1, wherein the first and/or second radial cross section has a U or V shape.

3. The loudspeaker according to claim 1, wherein the surround defines, along a central, closed curve thereof, a repeating pattern.

4. The loudspeaker according to claim 1, wherein the stiffening element has a portion with a radial cross section which has a shape of a closed curve.

5. The loudspeaker according to claim 4, wherein the stiffening element is hollow.

6. The loudspeaker according to claim 4, wherein the stiffening element is filled by a filling material.

7. The loudspeaker according to claim 4, wherein the stiffening element has a portion with a radial cross section which has a shape of a polygon.

8. The loudspeaker according to claim 7, wherein one side of the polygon is formed by the membrane.

9. The loudspeaker according to claim 4, wherein the stiffening element has a portion with a radial cross section which is oval.

10. The loudspeaker according to claim 1, wherein the stiffening element forms a closed curve in a predetermined plane.

11. The loudspeaker according to claim 10, wherein the combined membrane and stiffening element has, when projected on to the plane, a mass per area which is higher at the stiffening element than inside the closed curve.

12. The loudspeaker according to claim 10, wherein the combined membrane and stiffening element has, in a direction perpendicular to the plane, thickness which is higher at the stiffening element than inside the closed curve.

13. The loudspeaker according to claim 1, wherein the membrane and the stiffening element have a first mass per area, in a plane perpendicular to a direction of movement of the membrane, and the membrane has a second mass per area in the plane at a position not at the stiffening element, where the first mass per area is higher than the second mass per area.

14. The loudspeaker according to claim 1, wherein the stiffening element is configured to prevent flexure of the outer edge of the membrane during movement of the membrane.

15. The loudspeaker according to claim 1, wherein the membrane is funnel-shaped.

16. A method of assembling a loudspeaker, the method comprising:

providing a membrane having an outer edge, providing a frame, providing a surround having a first portion and a second portion, where:

the first portion has a first radial cross section extending from a third portion of an outer edge of the membrane to a point of the frame being closest to the third portion, which first portion is directed upwardly, and the second portion has a second radial cross section extending from a fourth portion of an outer edge of the membrane to a point of the frame being the closest to the fourth portion, which second portion is directed downwardly, wherein a portion of the surround, between the first and second portions, has a cross section with an M or W shape, providing a stiffening element and fixing the outer edge of the membrane to the surround and the stiffening element.

* * * * *